(12) United States Patent
Schilit et al.

(10) Patent No.: US 9,323,827 B2
(45) Date of Patent: Apr. 26, 2016

(54) IDENTIFYING KEY TERMS RELATED TO SIMILAR PASSAGES

(75) Inventors: William N. Schilit, Menlo Park, CA (US); Okan Kolak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1196 days.

(21) Appl. No.: 12/022,842

(22) Filed: Jan. 30, 2008

(65) Prior Publication Data

US 2009/0055394 A1  Feb. 26, 2009

Related U.S. Application Data

(60) Provisional application No. 60/956,880, filed on Aug. 20, 2007.

(51) Int. Cl.
*G06F 7/00* (2006.01)
*G06F 17/00* (2006.01)
*G06F 17/30* (2006.01)
*G06F 17/27* (2006.01)

(52) U.S. Cl.
CPC .... *G06F 17/30616* (2013.01); *G06F 17/30684* (2013.01); *G06F 17/271* (2013.01)

(58) Field of Classification Search
CPC .......................... G06F 17/30684; G06F 17/271
USPC ............................................................. 707/6
See application file for complete search history.

(56) References Cited

U.S. PATENT DOCUMENTS

| | | |
|---|---|---|
| 5,909,677 A | 6/1999 | Broder et al. |
| 5,926,812 A | 7/1999 | Hilsenrath et al. |
| 6,230,155 B1 | 5/2001 | Broder et al. |
| 6,256,622 B1 | 7/2001 | Howard et al. |
| 6,285,999 B1 | 9/2001 | Page |
| 6,295,542 B1 * | 9/2001 | Corbin .......................... 715/205 |
| 6,349,296 B1 | 2/2002 | Broder |
| 6,370,551 B1 | 4/2002 | Golovchinsky et al. |
| 6,411,953 B1 | 6/2002 | Ganapathy et al. |

(Continued)

OTHER PUBLICATIONS

Andrei Z. Broder et al., *Syntactic Clustering of the Web*, [online], SRC Technical Note 1997-015, Jul. 25, 1997, pp. 1-13, Retrieved from the URL:<http://gatekeeper.dec.com/pub/DEC/SRC/technical-notes/SRC-1997-015-html/>.

(Continued)

*Primary Examiner* — Evans Desrosiers
*Assistant Examiner* — Lawrence Cosby
(74) *Attorney, Agent, or Firm* — Fenwick & West LLP

(57) ABSTRACT

Key terms for similar passages from a large corpus are identified and used to enhance searching and browsing the corpus. The corpus contains multiple documents such as the text of books. Browsing by concept is supported by identifying a set of similar passages or quotations in documents stored in the corpus and assigning key terms to passages which links conceptually related passages together. The context of each passage instance is identified and can include, for example, the text surrounding the passage. The contexts of all similar passage instances are analyzed in order to identify key terms for the similar passage. The related key terms are analyzed to identify relationships among the key terms from different similar passage sets. The key terms can be used as a basis for navigating the documents in the corpus. The key terms enable browsing the documents in the corpus by concepts referenced in the documents.

25 Claims, 9 Drawing Sheets

(56) References Cited

U.S. PATENT DOCUMENTS

| | | | |
|---|---|---|---|
| 6,411,962 B1* | 6/2002 | Kupiec | |
| 6,615,209 B1 | 9/2003 | Gomes et al. | |
| 6,658,626 B1* | 12/2003 | Aiken | 715/205 |
| 6,665,837 B1 | 12/2003 | Dean et al. | |
| 6,859,800 B1 | 2/2005 | Roche et al. | |
| 7,139,752 B2 | 11/2006 | Broder et al. | |
| 7,146,361 B2 | 12/2006 | Broder et al. | |
| 7,277,766 B1 | 10/2007 | Khan et al. | |
| 7,536,408 B2 | 5/2009 | Patterson | |
| 7,660,819 B1 | 2/2010 | Frieder et al. | |
| 7,673,344 B1 | 3/2010 | Rowney | |
| 7,734,627 B1 | 6/2010 | Tong | |
| 2001/0000356 A1 | 4/2001 | Woods | |
| 2002/0052730 A1* | 5/2002 | Nakao | 704/10 |
| 2002/0123994 A1 | 9/2002 | Schabes et al. | |
| 2002/0161570 A1 | 10/2002 | Loofbourrow et al. | |
| 2003/0101181 A1* | 5/2003 | Al-Kofahi et al. | 707/7 |
| 2004/0064438 A1 | 4/2004 | Kostoff | |
| 2004/0117366 A1 | 6/2004 | Ferrari et al. | |
| 2005/0165600 A1* | 7/2005 | Kasravi | G06F 17/2211 704/9 |
| 2005/0198070 A1 | 9/2005 | Lowry | |
| 2006/0020607 A1 | 1/2006 | Patterson | |
| 2006/0129538 A1 | 6/2006 | Baader et al. | |
| 2006/0143175 A1* | 6/2006 | Ukrainczyk | G06F 17/218 |
| 2006/0287971 A1 | 12/2006 | Armstrong | |
| 2007/0055926 A1 | 3/2007 | Christiansen et al. | |
| 2007/0136281 A1 | 6/2007 | Li et al. | |
| 2007/0294610 A1 | 12/2007 | Ching | |
| 2008/0033982 A1 | 2/2008 | Parikh et al. | |
| 2008/0046394 A1 | 2/2008 | Zhou et al. | |
| 2008/0228769 A1* | 9/2008 | Lita et al. | 707/6 |

OTHER PUBLICATIONS

Sergey Brin et al., *Copy Detection Mechanisms for Digital Documents*, International Conference on Management of Data, Proceedings of the 1995 ACM SIGMOD International Conference on Management of Data, 1995, pp. 398-409, ISBN: 0-89791-731-6, San Jose, CA, USA.

Patrik D'Haeseleer, *How does DNA sequence motif discovery work?*, Nature Biotechnology, Aug. 2006, pp. 959-961, vol. 24, No. 8.

Theodor Holm Nelson, *Xanalogical Structure, Needed Now More than Ever: Parallel Documents, Deep Links to Content, Deep Versioning and Deep Re-Use*, ACM Computing Surveys (CSUR), Dec. 1999, vol. 31, Issue 4es, ISBN:0360-0300.

PCT International Search Report and Written Opinion, PCT/US2008/070557, Oct. 22, 2008, 11 pages.

* cited by examiner

| SPID | KID | KID | KID | KID | KID |
|------|-----|-----|-----|-----|-----|
| SP1  | K1  | K2  | K3  | K4  | K5  |
| SP2  | K1  | K4  | K5  | K6  | K8  |
| SP3  | K1  | K5  | K6  | K7  | K9  |
| SP4  | K3  | K4  | K5  | K8  | K9  |
| SP5  | K1...| K2 | K4  | K6  | K8  |
| ...  | ... | ... | ... | ... | ... |

FIG. 5

| SP1 | SP2 | SP3 |
|---|---|---|
| ⋮ | ⋮ | ⋮ |
| K1, K2 | K1, K4 | K1, K4 |
| K1, K3 | K1, K5 | K1, K5 |
| K1, K4 | K1, K6 | K1, K6 |
| K1, K5 | K1, K8 | K1, K8 |
| K2, K1 | K4, K1 | K4, K1 |
| K2, K3 | K4, K5 | K4, K5 |
| K2, K4 | K4, K6 | K4, K6 |
| K2, K5 | K4, K8 | K4, K8 |
| K3, K1 | K5, K1 | K5, K1 |
| K3, K2 | K5, K4 | K5, K4 |
| K3, K4 | K5, K6 | K5, K6 |
| K3, K5 | K5, K8 | K5, K8 |
| ⋮ | ⋮ | ⋮ |

Six Degrees: The Science of a Connected Age By Duncan J. Watts

🔍⊕        Page ▲▼        ⛶ Full screen

THE CONNECTED AGE • 41 your friends know each other, the less use they are to you in getting a message to someone you don't know.

The paradox of social networks that Milgram's experiment illuminated is that on the one hand, the world is highly clustered—many of my friends are also friends of each other. Yet on the other hand, we can still manage to reach anyone at all in an average of only a few steps. Although Milgram's small-world hypothesis has stood largely unchallenged for over three decades, it remains surprising to this day. As Ouisa says in Guare's play, "everybody on this planet is separated by only six other people. Six degrees of separation. Between us and everybody else on this planet. The president of the United States. A gondolier in Venice.... It's not just the big names. It's *anyone*. A native in a rain forest. A Tierra del Fuegan. An Eskimo. I am bound to everyone on this planet by a trail of six people. It's a profound thought."

And it is a profound thought. If we are thinking only about a certain subgroup of people, people with whom we have something obvious in common, then we might think the result is hardly surprising. For example, I teach at a university, and because the university world consists of a relatively small number of people, many of who have a good deal in common, it's relatively easy for me to imagine how I might pass a message through a sequence of colleagues to any other university professor anywhere in the world. Similar reasoning might convince you that I could get a message to most college-educated professionals in the New York area. But this is not really the small-world phenomenon—it's more like a small-group phenomenon. The claim of the small-world phenomenon like

700

702

704 →
Happy families are all alike, every unhappy family is unhappy in its own way.
303 books (1907-2007)
Page 148
side of a triangle is always less than or equal to the sum of the lengths of the other two sides. In other words,
65 books (1942-2006)
Page 7
I read somewhere that everybody on this planet is separated by only six other people. Six degrees of separation. Between us and everybody else on this...
24 books (1994-2007)

706 →
Page 41
everybody on this planet is separated by only six other people. Six degrees of separation. Between us and everybody else on this planet. The president...
29 books (1994-2007)

708 →
Page 115
All the things we do, all the features that define us, and all the activities we pursue that lead us to meet and interact with each other are contexts...
3 books (2003-2005)

Page 328
In Dietterich, T. G., Becker, S., and Ghahramani, Z. (eds.), Advances in Neural Information Processing Systems (NIPS), 14 (MIT Press, Cambridge, MA, Books   All books - Limited preview - Full view

Popular passages with key term "Stanley Milgram"    Popular Passages 1 - 10 of 16 on "Stanley Milgram". (0.04 seconds)

Related terms: Social Hierarchies (45), Cyrano Effect (23), Social
Psychology (12)

→ 902

900

"It may be that we're all puppets–puppets controlled by the strings of society. But at least we are puppets with perception, with awareness."
The individual In A Social World: Essays and Experiments, page 233
by Stanley Milgram - Psychology - 1992 - 320 pages.
  Also appears in 22 books from 1998-2000
  Key Terms: Obedience Experiment (12), Tenth Level (3)

"When an individual wishes to stand in opposition to authority, he does best to find support for his position fro others in his group. The mutual
support provided by men for each other is the strongest bulwark we have against the excesses of authority.."
Portraits of pioneers in psychology - Page 315
by Gregory A. Kimble, Michael Wertheimer, C. Alan Boneau, Charlotte White.
  Also appears in 11 books from 1998-2000
  Key Terms: Social Hierarchies (12), Behavioral Obedience (4)

"The social psychology of this century reveals a major lesson: often it is not so much the kind of person a man is as the kind of situation in which he
finds himself that determines how he will act."
Obedience to Authority: Current Perspectives on the Milgram Paradigm - Page 35
by Thomas Blass - Self-Help - 2000 - 264 pages.
  Also appears in 13 books from 1998-2000
  Key Terms: Small World Problem(33,), Cyrano effect (3)

904

Google ▶
Result Page:  1 2  Next

FIG. 9

IDENTIFYING KEY TERMS RELATED TO SIMILAR PASSAGES

CROSS REFERENCE TO RELATED APPLICATIONS

This application claims the benefit of U.S. Patent Provisional Application No. 60/956,880, filed Aug. 20, 2007, the contents of which are hereby incorporated by reference.

This application is related to U.S. patent application Ser. No. 11/781,213, filed Jul. 20, 2007, and titled "Identifying and Linking Similar Passages in a Digital Text Corpus," the contents of which are hereby incorporated by reference.

BACKGROUND OF THE INVENTION

1. Field of the Invention

This invention pertains in general to identifying key terms in digital text documents and in particular to identifying key terms related to similar passages in the digital text corpus.

2. Description of the Related Art

Advancement in digital technology has changed the way people acquire information. For example, people now can view electronic documents that are stored in a predominantly text corpus such as a digital library that is accessible via the Internet. Such a digital text corpus is established, for example, by scanning paper copies of documents including books and newspapers, and then applying an optical character recognition (OCR) process to produce computer-readable text from the scans. The corpus can also be established by receiving documents and other texts already in machine-readable form.

Unlike in a hypertext corpus, a document in a digital text corpus rarely contains functional links to other documents either in the same corpus or in other corpora. Moreover, mining references from the text of documents in a digital text corpus to support general link-based browsing is a difficult task. Functional hypertext references such as URLs are rare. Citations and other forms of inline references are also seldom used outside of scholarly and professional works.

This lack of a link structure makes it difficult to browse documents in the corpus in the same manner that one might browse a set of web pages on the Internet. As a result, browsing the documents in the corpus can be less stimulating than traditional web browsing because one cannot browse by related concept or by other characteristics.

SUMMARY OF THE INVENTION

A computer-implemented method of identifying at least one key term related to a similar passage includes identifying a plurality of documents stored in a corpus. Each document contains an instance of the similar passage. The method also includes identifying a context for each similar passage instance based, at least in part, on the document in which the similar passage instance appears, determining at least one key term related to the similar passage based on the contexts of the similar passage instances, and storing the at least one key term on a computer-readable storage medium.

A computer-readable storage medium containing executable program code for determining indexing events includes program code for identifying a plurality of documents stored in a corpus. Each document contains an instance of the similar passage. The computer-readable storage medium also includes program code for identifying a context for each similar passage instance based, at least in part, on the document in which the similar passage instance appears, program code for determining at least one key term related to the similar passage based on the contexts of the similar passage instances, and program code for storing the at least one key term on a computer-readable storage medium.

A computer system for capturing event data from a target window of a target application in a computer system includes means for identifying a plurality of documents stored in a corpus. Each document contains an instance of the similar passage. The computer system also includes means for identifying a context for each similar passage instance based, at least in part, on the document in which the similar passage instance appears, means for determining at least one key term related to the similar passage based on the contexts of the similar passage instances, and means for storing the at least one key term on a computer-readable storage medium.

BRIEF DESCRIPTION OF THE DRAWINGS

FIG. 5 illustrates a sample similar passage and key term table generated by the key term relation module according to one embodiment.

FIG. 6 illustrates a sample similar passage and key term table generated by the key term relation module according to one embodiment.

FIG. 7 is an exemplary web page showing information about a book in the digital corpus according to one embodiment.

FIG. 9 is an exemplary web page showing search results by key term and related key terms according to another embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
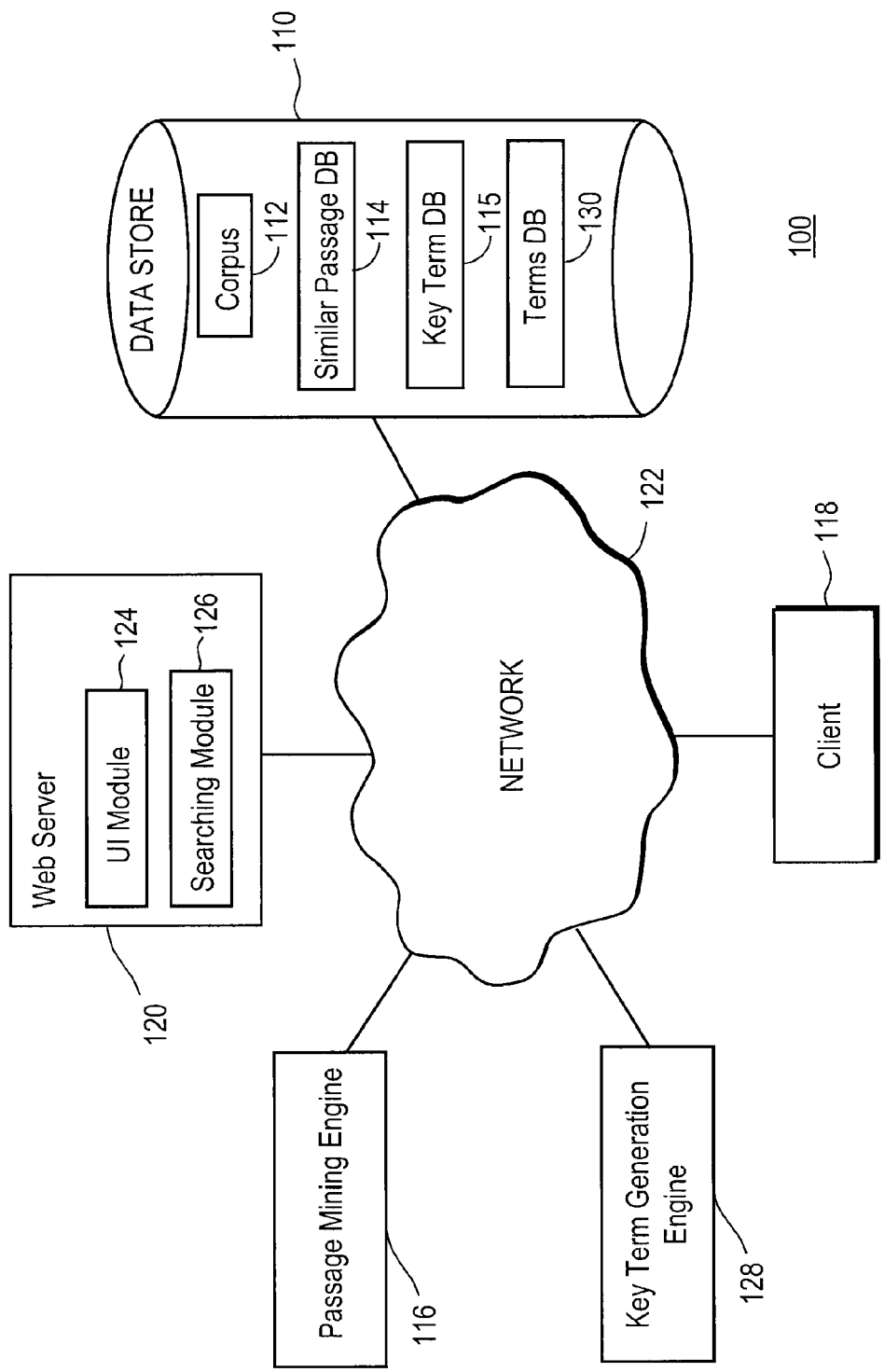
FIG. 1 shows an environment adapted to support identifying key terms related to similar passages according to one embodiment.

FIG. 1 shows an environment 100 adapted to support identifying and navigating similar passages of text in a digital text corpus 112 and identifying key terms related to such similar passages according to one embodiment. The environment 100 includes a data store 110 for storing the corpus 112, a similar passage database 114, a key term database 115, an optional terms database 130, a passage mining engine 116 for identifying similar passages in the corpus, and a key term generation engine 128 for identifying key terms related to the similar passages. The environment also includes a client 118 for requesting and/or viewing information from the data store 110, and a web server 120 for interacting with the client and providing interfaces allowing the client to access the information in the data store. A network 122 enables communications between and among the data store 110, passage mining engine 116, key term generation engine 128, client 118, and web server 120.

Not all the entities shown in FIG. 1 are required to be connected to the network 122 at the same time for the functionalities described herein to be realized. In one embodiment, passage mining engine 116 and/or key term generation engine 128 are connected to the network 122 periodically. When it is online, the engines 116 and 128 only need to communicate with the data store 110 in order to identify similar passages in the corpus 112 and store the passage data in the passage database 114. The engines 116 and 128 do not need to interact with the client 118 or the web server 120 according to one embodiment. Once identifying similar passages is finished, the passage mining engine 116 may be off-line, and the web server 120 supports passage navigating by interacting with the client 118 and the data store 110 to retrieve information from the data store that is requested by the client. Similarly, once the key term identification is done, the key term generation engine 128 may be off-line, and the web server 120 supports key term retrieval by interacting with the client 118 and data store 110 to retrieve information from the data store that is requested by the client. In another embodiment, the key term generation engine 128 is connected to the network 122 periodically. When it is online, the key term generation engine 128 only needs to communication with the passage mining engine 116 in order to identify which similar passages to extract key terms from. The key term generation engine 128 does not need to interact with the client 118 or the web server 120 according to one embodiment. Once the key term extraction and identification is finished, the key term generation engine 128 may be off-line, and the web server 120 supports passage navigation and key term identification by interacting with the client 118 and the data store 110 to retrieve the information from the data store that is requested by the client. Moreover, different embodiments of the environment 100 include different and/or additional entities than the ones shown in FIG. 1, and the entities are organized in a different manner.

The data store 110 stores the corpus 112 of information, the similar passage database 114, the key term database 115, and an optional terms database 130. It also stores data utilized to support the functionalities or generated by the functionalities described herein. The data store 110 can also store one or more other corpora and data. The data store 110 receives requests for information stored in it and provides the information in return. In a typical embodiment, the data store 110 is comprised of multiple computers and/or storage devices configured to collectively store a large amount of information.

The corpus 112 stores a set of information. In one embodiment, the corpus 112 stores the contents of a large number of digital documents. As used herein, the term "document" refers to a written work or composition. This definition includes, for example, conventional books such as published novels, and collections of text such as newspapers, magazines, journals, pamphlets, letters, articles, web pages and other electronic documents. The document contents stored by the corpus 112 include, for example, the document text represented in a computer-readable format, images from the documents, scanned images of pages from the documents, etc. In one embodiment, each document in the corpus 112 is assigned a unique identifier referred to as its "Doc ID," and each word in the document is assigned a unique identifier that describes its position in the document and is referred to as its "Pos ID." As used herein, the term "word" refers to a token containing a block of structured text. The word does not necessarily have meaning in any language, although it will have meaning in most cases.

In addition, the corpus 112 stores metadata about the documents within it. The metadata are structured data that describe the documents. Examples of metadata include metadata about a book such as the author, publisher, year published, number of pages, and edition.

The similar passage database 114 stores data describing similar passages in the corpus 112. As used herein, the phrase "similar passage" refers to a passage in a source document that is found in a similar form in one or more different target documents. Occurrences of the same similar passage are referred to as "instances" of that passage. Oftentimes, the similar passage instances are identical and may be referred to as "quotations" or "shared passages." Nevertheless, the passages are referred to as "similar" because there might be slight differences among the passage instances in the different documents. When a source document is said to have multiple "similar passages," it means that multiple passages in the source document are also found in target documents. This phrase does not necessarily mean that the "similar passages" within the source document are similar to each other. Similar passages are also referred to as "popular passages" and "related passages."

In one embodiment, the passage database 114 is generated by the passage mining engine 116 to store information obtained from passage mining. In some embodiments, the passage mining engine 116 constructs the passage database 114 by copying existing quotation collections such as Bartlett's, and searching and indexing the instances of quotations and their variations that appear in the corpus 112. In some embodiments, the passage mining engine 116 constructs the passage database 114 by copying existing text appearing in a quoted form, such as delimited by quotation marks, from the corpus, and searching and indexing the instances of phrases in the corpus 112. Further, in some embodiments the passage mining engine 116 constructs the passage database 114 by copying each group of words, such as sentences, from the corpus, and searching and indexing the instances of the group of words in the corpus 112. In one embodiment, the database 114 stores similar passages, Doc IDs of the documents in which the passages exist, Pos IDs within the documents at which the passages appear, passage ranking results, etc. Further, in some embodiments, the database 114 also stores the documents or portions of the documents that have the similar passages.

The key term database 115 stores key terms associated with the similar passages. In one embodiment, the key term database 115 is generated by the key term generation engine 128. As used herein, the phrase "key term" refers to a term relevant to a particular passage. Key terms may be single words or phrases.

The optional terms database 130 stores possible key terms. For example, the terms database may store author names, names of concepts, named entities (such as people, places, or things), political figures, or other interesting terms. The terms database 130 may be used for key term extraction in accordance with some embodiments.

The passage mining engine 116 includes one or more computers adapted to analyze the texts of documents in the corpus 112 in order to identify similar passages. For example, the passage mining engine 116 may find that the passage "I read somewhere that everybody on this planet is separated by only six other people" from the book "Six Degrees of Separation" by John Guare, also appears in 13 other books published between 2000 and 2006. The passage mining engine 116 may store, in the similar passage database 114, the passage, its location in the "Six Degrees of Separation" book, Doc IDs of the 13 other books, its location in the 13 other books, and its ranking relative to other passages in the "Six Degrees of Separation" book. More detail regarding the passage mining engine is described in the related application, U.S. patent application Ser. No. 11/781,213, filed Jul. 20, 2007, and titled "Identifying and Linking Similar Passages in a Digital Text Corpus."

Passage mining may be performed off-line, asynchronously of any queries made by the client 118 against the data store 110. In one embodiment, the passage mining engine 116 runs periodically to process all the text information in the corpus 112 from scratch and generate similar passage data for storing in the similar passage database 114, disregarding any information obtained from prior passage mining. In another embodiment, the passage mining engine 116 is used periodically to incrementally update the data stored in the similar passage database 114, for example, as new documents are added to the corpus 112.

The key term generation engine 128 includes one or more computers adapted to identify the contexts of the similar passages identified by the passage mining engine 116 and extract key terms therefrom. The key terms for each passage are extracted by examining the contexts of the passage instances, aggregating the contexts together, and performing a key term extraction on the aggregated contexts. In some embodiments, the key term generation engine 128 also determines which key terms are related. In other words, in some embodiments, the key term generation engine 128 may also determine which key terms tend to appear together in the contexts of different similar passages.

Key term generation may be performed off-line, asynchronously of any queries made by client 118 against the data store 110. In one embodiment, the key term generation engine 128 runs periodically to process all of the context from the data store 110 from scratch and generate key terms for storing in the key term database 115. In another embodiment, key term generation engine 128 is used periodically to incrementally update the data stored in the key terms database 115, for example, as new similar passages are found and added to the similar passage database.

In one embodiment, the client 118 is an electronic device having a web browser for interacting with the web server 120 via the network 122, and it is used by a human user to access and obtain information from the data store 110. It can be, for example, a notebook, desktop, or handheld computer, a mobile telephone, personal digital assistant (PDA), mobile email device, portable game player, portable music player, computer integrated into a vehicle, etc.

The web server 120 interacts with the client 118 to provide information from the data store 110. In one embodiment, the web server 120 includes a User Interface (UI) module 124 that communicates with the client's 118 web browser to receive and present information. The web server 120 also includes a searching module 126 that searches for information in the data store 110. For example, the UI module 124 may receive a document query from the web browser issued by a user of the client 118, and the searching module 126 may execute the query against the corpus 112 and the similar passage database 114, and retrieve information including similar passages information that satisfies the query. As another example, the UI module 124 may receive a document query from the web browser issued by a user of the client 118, and the searching module 126 may execute the query against the corpus 112, the similar passage database 114, and the key term database 115, and retrieve information including similar passages information, along with key terms related to the similar passages, that satisfies the query. Further, the searching module 126 may execute a query against the key term database 115 to retrieve information corresponding to key terms related to the search query itself. The UI module 124 then interacts with the web browser on the client 118 to present the retrieved information in hypertext. In one embodiment, hyperlinks are provided to allow the user of the client 118 to navigate to the portions of a document that contains similar passages, or to browse other documents that share the similar passages, much like the way traditional web-browsing is conducted. In another embodiment, the related key terms are presented as hyperlinks to allow the user of the client 118 to navigate to other similar passages associated with the selected key term.

The network 122 represents communication pathways between the data store 110, passage mining engine 116, client 118, web server 120, and the key term generation engine 128. In one embodiment, the network 122 is the Internet. The network 122 can also utilize dedicated or private communications links that are not necessarily part of the Internet. In one embodiment, the network 122 uses standard communications technologies, protocols, and/or interprocess communications techniques. Thus, the network 122 can include links using technologies such as Ethernet, 802.11, integrated services digital network (ISDN), digital subscriber line (DSL), asynchronous transfer mode (ATM), etc. Similarly, the networking protocols used on the network 122 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 122 can be represented using technologies and/or formats including the hypertext markup language (HTML), the extensible markup language (XML), etc. In addition, all or some of links can be encrypted using conventional encryption technologies such as the secure sockets layer (SSL), HTTP over SSL (HTTPS), and/or virtual private networks (VPNs). In another embodiment, the nodes can use custom and/or dedicated data communications technologies instead of, or in addition to, the ones described above.

Figure 2:
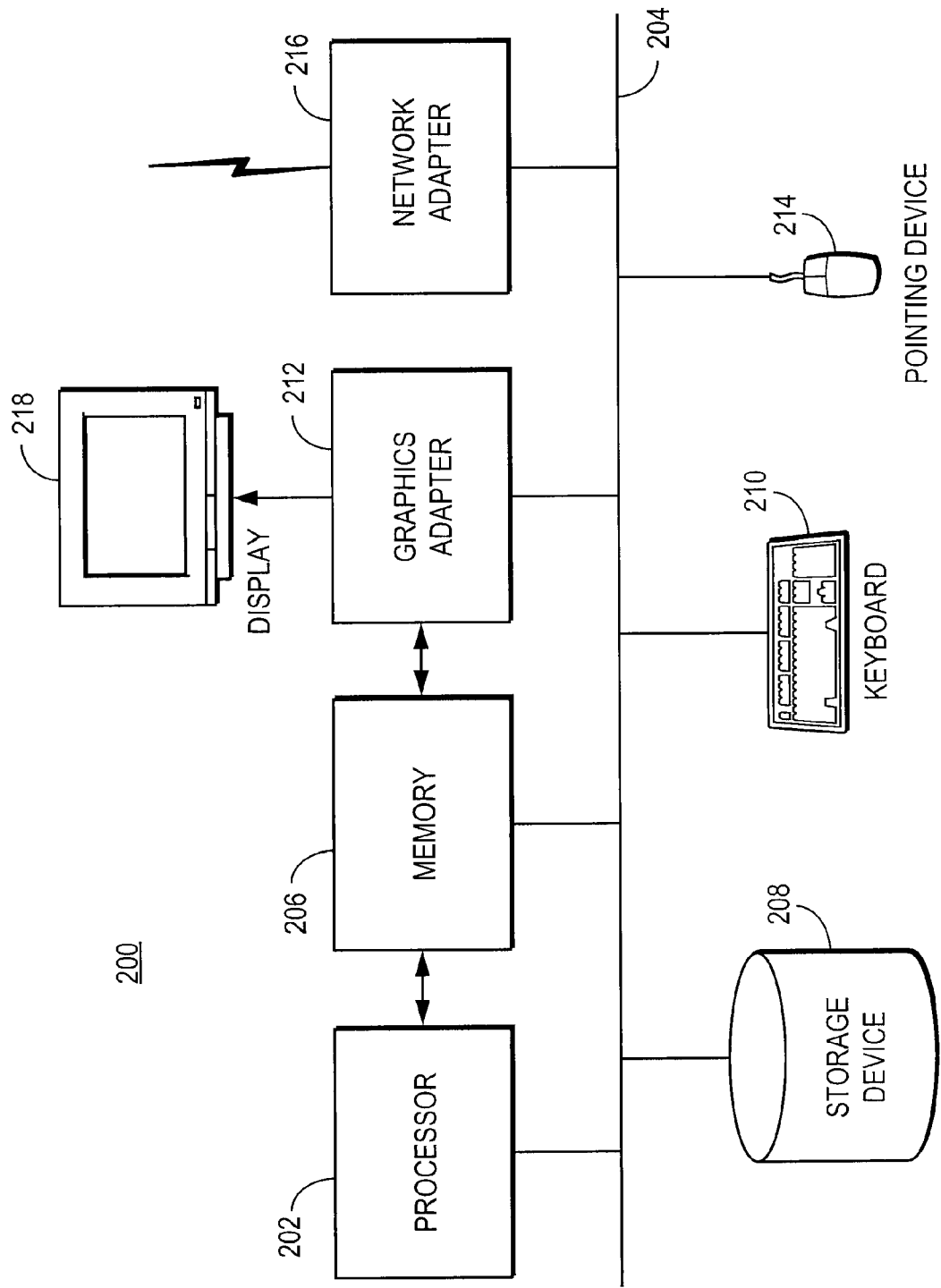
FIG. 2 is a high-level block diagram illustrating a functional view of a typical computer for use as one of the entities illustrated in the environment of FIG. 1 according to one embodiment.

FIG. 2 is a high-level block diagram illustrating a functional view of a typical computer 200 for use as one or more of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is any device capable of holding data, like a hard drive, compact disk read-only memory (CD-ROM), DVD, or a solid-state memory device. The memory 206 holds instructions and data used by the processor 202 and may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 122.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202 as one or more processes.

The types of computers used by the entities of FIG. 1 can vary depending upon the embodiment and the processing power utilized by the entity. For example, the client 118 typically requires less processing power than the passage mining engine 116, key term generation engine 128 and web server 120. Thus, the client 118 system can be a standard personal computer or a mobile telephone. The passage mining engine 116, key term generation engine 128, and web server 120, in contrast, may comprise processes executing on more powerful computers, logical processing units, and/or multiple computers working together to provide the functionality described herein. Further, the passage mining engine 116, key term generation engine 128, and web server 120 might lack devices that are not required to operate them, such as displays 218, keyboards 210, and pointing devices 214.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
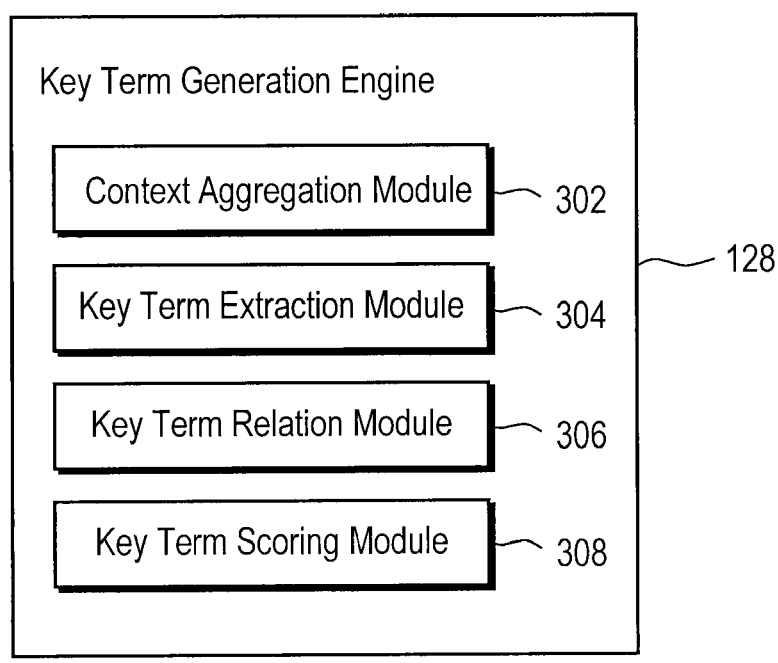
FIG. 3 is a high-level block diagram illustrating modules within the key term generation engine according to one embodiment.

FIG. 3 is a high-level block diagram illustrating modules within the key term generation engine 128 according to one embodiment. An embodiment of the key term generation engine 128 identifies contexts of the instances of a similar passage, extracts key terms from the contexts, and stores the extracted key terms and related information in the key term database 115. Some embodiments have different and/or additional modules than those shown in FIG. 3. Moreover, the functionalities can be distributed among the modules in a different manner than described here.

The context aggregation module 302 identifies the context of each similar passage instance. The context includes the words surrounding the similar passage instance in the document in which it appears. The context can include pre-context and/or post-context. Pre-context is a number words that appear before the first word of the similar passage instance. For example, the pre-context may be the ten words that appear before the similar passage instance. Similarly, post-context are a number of words that appear after the similar passage instance. For example, post-context may be the fifteen words that appear after the last word of the similar passage instance. The context may also include descriptive data such as metadata associated with the document that contains the similar passage instance. Examples of metadata are words that help to describe the document, such as the author of the document where the instance appears, the subject matter on which the document is about, or the date when the document was written or published. The context aggregation module 302 extracts the contexts from the different documents in which the similar passage instances appear, and combines all of the extracted contexts together to form a context aggregation.

The key term extraction module 304 determines key terms related to the similar passages based on the context aggregation. In one embodiment, the key term extraction module 304 receives the context aggregation for a set of similar passage instances from the context aggregation module 302 and extracts the key terms there from. Key term extraction may be performed by a variety of methods. In some embodiments, key term extraction is performed by using a term frequency-inverse document frequency (TF-IDF)-based analysis. TF-IDF-based analysis is used to determine how important a term is to the context aggregation. The importance increases proportionally to the number of times the term appears in the aggregation, but is offset by the frequency of the term in a corpus, such as corpus 112. The terms in the context aggregation for a similar passage having high TF-IDF scores (relative to other terms in the aggregation) are extracted as the key terms for the similar passage.

In other embodiments, key term extraction is performed by first compiling a list or database of possible key terms. For example, a terms database 130 of author names, names of concepts, named entities (such as people, places, or things), political figures, or other interesting terms may first be established. Key term extraction may then be performed by comparing the terms in the context aggregation with the terms found in the established terms databases. If a term in the context aggregation matches a term in the terms database, that term is extracted from the context aggregation, identified as a key term, and stored in the key terms database 115.

In some embodiments, key terms are extracted by first generating n-grams from the context aggregation. Each generated n-gram is a key term candidate, and TF-IDF-based analysis is performed on each n-gram. In some embodiments, different key term candidates are merged based on similarities and associations among them. This merging is accomplished by analyzing small variations in the spelling of similar candidate key terms. The merging may also be accomplished by analyzing morphological variations or alternative representations of similar candidate key terms. Candidate key terms that are merged together represent one key term and their frequencies of appearance are merged as well. For example. "John Kennedy," "JFK," "John F. Kennedy," and "John Fitzgerald Kennedy" may be extracted as separate key term candidates appearing in the analyzed documents. However, since these terms represent the same individual, the separate terms are merged to represent one key term.

In some embodiments, weights of candidate key terms may be boosted, or increased, based on whether a key term has been defined or described by a separate resource. For example, if a candidate key term appears within an on-line encyclopedia, such as "Wikipedia," the weight of that key term may increase accordingly. Weights may be used both to extract key terms and to determine which key terms to display.

According to one embodiment, the key term generation engine 128 has only two modules, a context aggregation module and a key term extraction module. The context aggregation module identifies the contexts of similar passage instances in documents and the key term extraction module extracts the key terms from the contexts.

The key term relation module 306 determines relationships among key terms. In some embodiments, relationship of key terms is determined by co-location of key terms across multiple similar passages. The key term relation module 306 identifies the key terms that are associated with a given similar passage, and determines whether the same key terms, or a subset of the key terms, are also associated with other similar passages. Key terms that are co-located across multiple similar passages are identified as "related."

For example, FIG. 5 illustrates a sample similar passage and key term table 500 generated by the key term relation module 306 according to one embodiment. Each row of the key term table 500 has the key term information for a similar passage in the corpus 112. The leftmost column 500 of the table identifies the similar passage by its similar passage ID (SPID). The row extending rightward from column 512 identifies the key terms related to the identified similar passage by its key term ID (KID). Notice that K1 and K4 appear together in SP1, SP2, and SP5. Thus, an embodiment of the key term relation module 306 determines that K1 and K4 are related.

In some embodiments, for each similar passage, key term pairs are generated for every key term associated with the similar passage. Then, key terms of other similar passages are analyzed to determine whether they share the same key term pairs.

In some other embodiments, the related key terms are identified by examining the plurality of the similar passages as a whole. The example of FIG. 6 shows three columns respectively containing key term pairs for similar passages one through three (labeled "SP1," "SP2," and "SP3"). Column 604 indicates that SP1 is associated with key term pairs: K1, K2; K1, K3; K1, K4; K2, K1; K2, K3; K2, K4; etc. FIG. 6 shows that K1 and K4 appear together in SP1, SP2, and SP3. Therefore, an embodiment of the key term relation module 306 determines that key terms K1 and K4 are related. One method of determining related key terms may be done by creating a table such as the one described in FIG. 6, then sorting the entries of the table to determine which key terms appear in the same similar passages.

In some embodiments, a key term scoring module 308 determines which extracted key terms are displayed on a user interface. For example, there may be numerous key terms that are extracted from a similar passage and therefore, too many to display at once. The key term scoring module 308 uses signals, such as the TF-IDF score associated with a key term, the presence of a key term in a query supplied by a user, an assigned weight, etc. to rank and select the key terms to display. In other embodiments, the key term scoring module 308 selects the first key terms extracted, for example, or the first ten key terms extracted.

Figure 4:
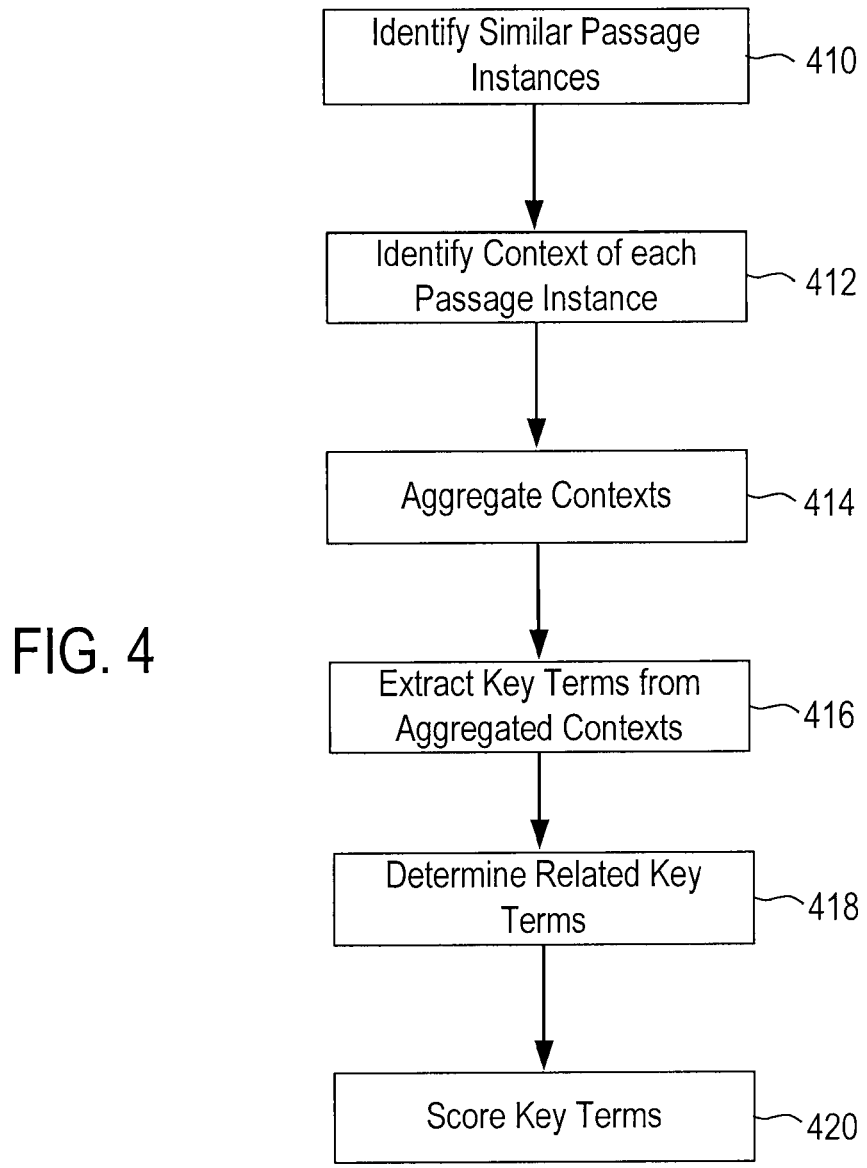
FIG. 4 is a flow chart illustrating steps performed by the key term generation engine according to one embodiment.

FIG. 4 is a flow chart illustrating steps performed by the key term generation engine 128 according to one embodiment. Other embodiments may perform different or additional steps than the ones shown in FIG. 4.

As shown in FIG. 4, the passage mining engine 114 identifies 410 a set of similar passage instances in the digital corpus 112. The context aggregation module 302 identifies 412 the contexts of the similar passage instances. The contexts may include post-context, pre-context, all text, or metadata associated with the passage. The contexts are aggregated 414. Key terms are extracted 416 from the aggregated contexts. The key term relation module 306 determines 418 relationships among the key terms of multiple similar passages. In some embodiments, relationship of key terms is determined by examining co-location.

Figure 8:
FIG. 8 is an exemplary web page showing key terms of a similar passage according to another embodiment

In some embodiments, a key term scoring module 308 determines and scores 420 the key terms to be displayed on a client device. For example, as shown in FIG. 8 and as will be described below, key terms 804 for similar passage 802 are displayed. In this embodiment, the similar passage 802 may have many key terms related to it, but only five are presented for display.

FIGS. 7, 8, and 9 are exemplary web pages according to some embodiments. FIG. 7 is an exemplary web page 700 showing information about a book in the digital corpus according to one embodiment. In one embodiment, this web page 700 is generated by user interface module 124. In some embodiments, the web page 700 is generated when a user selects a book to be displayed from the digital corpus.

The page 700 is separated into several regions. A user browses through the book and views pages of the book in the text region 702. The passage presentation region 704 shows the similar passages in the book. A user can click on the page number 706 to jump to the associated section of the book. This allows the user to jump to different sections of the book to read the similar passage and its context. When a user clicks on the popularity information link 708, the current browser window will allow the user to navigate to other documents and the specific books that share the passage. In some embodiments, when the user selects the popularity information link 708, the user is presented with web page 800 as shown in FIG. 8.

Page 800 in FIG. 8 shows the selected similar passage 802 and the passage's related key terms 804. Page 800 also shows results 806, which is a listing of the specific books that share the same passage. As shown in this screenshot, five key terms are displayed as hyperlinks after the similar passage. When a user of the client 118 selects the particular key term represented by the hyperlink, the user may navigate to other similar passages related to the selected key term. As seen in this figure, following each displayed hyperlink of the key term, a number of available passages associated with that key term are displayed in parenthesis. For example, the key term "John Guare" has 210 similar passages associated with this particular key term, while key term "Kevin Bacon" only has two.

In some embodiments, a user enters a search query, for example, "Stanley Milgram" and is presented with web page 900 as shown in FIG. 9. Web page 900 shows key terms 902 that are related to the search query entered by the user. In this example, Web page 900 shows three key terms related to key term "Stanley Milgram." Web page 900 also shows results 904 listing popular passages that are associated with the key term "Stanley Milgram." In some embodiments, web page 900 may be displayed when a user enters the term "Stanley Milgram" into a search query field. In other embodiments, web page 900 may be displayed when a user selects a "Stanley Milgram" hyperlink, such as the one shown in FIG. 8. Similar to the previous example in FIG. 8, if a user of a client 118 selects the key term represented by the hyperlinks, the user can navigate to other similar passages associated with the selected key term.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-implemented method of identifying at least one key term related to a similar passage, comprising:
   identifying a plurality of documents stored in a corpus, wherein each identified document contains an instance of the similar passage;
   for each similar passage instance within the identified documents, extracting each word that appears within a threshold number of words before the similar passage instance within an identified document and each word that appears within a threshold number of words after the similar passage instance within the identified document, the extracted words associated with the similar passage instance;
   combining the extracted words associated with each similar passage instance to form a context aggregation;
   determining a plurality of key terms related to the similar passage based on the context aggregation, each key term associated with a subset of the similar passage instances, at least one key term determined by comparing words within the context aggregation to a terms database specifying possible key terms and extracting a word within the context aggregation that matches a term in the terms database;

presenting each of one or more key terms as a hyperlink in a user interface;
receiving a selection of a key term presented as a hyperlink; and
presenting the subset of similar passage instances associated with the selected key term in the user interface.

2. The method of claim 1, wherein determining at least one key term comprises performing a TF-IDF analysis of the context aggregation to determine the at least one key term.

3. The method of claim 1, wherein determining at least one key term comprises:
generating candidate n-grams based on the context aggregation; and
performing a TF-IDF analysis of the candidate n-grams to determine the at least one key term.

4. The method of claim 1, further comprising: combining words from metadata describing individual ones of the plurality of documents containing instances of the similar passage with the context aggregation;
wherein determining at least one key term related to the similar passage is based at least in part on the metadata.

5. The method of claim 1, wherein first and second key terms are determined for the similar passage, further comprising:
determining a relationship between the first and second key terms of the similar passage.

6. The method of claim 5, wherein there exists a plurality of other similar passages, with each other similar passage having an associated set of key terms, and determining a relationship comprises:
determining whether the first and second key terms are co-located in a set of key terms associated with another similar passage;
declaring that the first and second key terms of the similar passage are related responsive to a positive determination that the first and second key terms are co-located in a set of key terms associated with the other similar passage.

7. The method of claim 1, wherein the extracting comprises:
identifying a pre-context for the similar passage instance comprising the words appearing within the threshold number of words before the similar passage instance;
identifying a post-context for the similar passage instance comprising the words appearing within the threshold number of words after the similar passage instance; and
forming a context associated with the similar passage instance by combining the pre-context and the post-context for the similar passage instance;
wherein combining the extracted words comprises combining a plurality of contexts associated with a plurality of instances of the similar passage.

8. The method of claim 1, wherein the threshold number of words before the similar passage instance is different than the threshold number of words after the similar passage instance.

9. The method of claim 1, further comprising:
determining a plurality of key terms related to the similar passage based on the context aggregation;
assigning scores to the plurality of key terms;
selecting a subset of the plurality of key terms responsive to the assigned scores; and
presenting for display the selected subset of the plurality of key terms in association with the similar passage.

10. The method of claim 1, wherein presenting a key term as a hyperlink comprises presenting text associated with the key term and presenting a number of similar passage instances in the subset of similar passage instances associated with the key term.

11. The method of claim 1, wherein the subset of similar passage instances associated with the selected key term comprises less than all similar passage instances.

12. A non-transitory computer-readable storage medium containing executable program code for identifying at least one key term related to a similar passage, comprising:
program code for identifying a plurality of documents stored in a corpus, wherein each identified document contains an instance of the similar passage;
program code for, for each similar passage instance within the identified documents, extracting each word that appears within a threshold number of words before the similar passage instance within an identified document and each word that appears within a threshold number of words after the similar passage instance within the identified document, the extracted words associated with the similar passage instance;
program code for combining the extracted words associated with each similar passage instance to form a context aggregation;
program code for determining a plurality of key terms related to the similar passage based on the context aggregation, each key term associated with a subset of the similar passage instances, at least one key term determined by comparing words within the context aggregation to a terms database specifying possible key terms and extracting a word within the context aggregation that matches a term in the terms database;
program code for presenting each of one or more key terms as a hyperlink in a user interface;
program code for receiving a selection of a key term presented as a hyperlink; and
program code for presenting the subset of similar passage instances associated with the selected key term in the user interface.

13. The non-transitory computer-readable storage medium of claim 12, wherein the program code for determining at least one key term further comprises:
program code for performing a TF-IDF analysis of the context aggregation to determine the at least one key term.

14. The non-transitory computer-readable storage medium of claim 12, wherein the program code for determining at least one key term further comprises:
program code for generating candidate n-grams based on the context aggregation; and
program code for performing a TF-IDF analysis of the candidate n-grams to determine the at least one key term.

15. The non-transitory computer-readable storage medium of claim 12, further comprising:
program code for combining words from metadata describing individual ones of the plurality of documents containing instances of the similar passage with the context aggregation;
wherein determining at least one key term related to the similar passage is based at least in part on the metadata.

16. The non-transitory computer-readable storage medium of claim 12, wherein first and second key terms are determined for the similar passage, further comprising:
program code for determining a relationship between the first and second key terms of the similar passage.

17. The non-transitory computer-readable storage medium of claim 16, wherein there exists a plurality of other similar passages, with each other similar passage having an associated set of key terms, and the program code for determining a relationship comprises:

program code for determining whether the first and second key terms are co-located in a set of key terms associated with an other similar passage;

program code for declaring that the first and second key terms of the similar passage are related responsive to a positive determination that the first and second key terms are co-located in a set of key terms associated with the other similar passage.

18. The non-transitory computer-readable storage medium of claim 12, wherein presenting a key term as a hyperlink comprises presenting text associated with the key term and presenting a number of similar passage instances in the subset of similar passage instances associated with the key term.

19. A computer system for identifying at least one key term related to a similar passage comprising:

a hardware processor; and a non-transitory computer-readable storage medium storing executable instructions configured to, when executed by the processor, perform steps comprising:

identifying a plurality of documents stored in a corpus, wherein each identified document contains an instance of the similar passage;

for each similar passage instance within the identified documents, extracting each word that appears within a threshold number of words before the similar passage instance within the identified document and each word that appears within a threshold number of words after the similar passage within the identified document, the extracted words associated with the similar passage instance;

combining the extracted words associated with each similar passage instance to form a context aggregation;

determining a plurality of key terms related to the similar passage based on the context aggregation, each key term associated with a subset of similar passage instances, at least one key term determined by comparing words within the context aggregation to a terms database specifying possible key terms and extracting a word within the context aggregation that matches a term in the terms database;

presenting each of one or more key terms as a hyperlink in a user interface;

receiving a selection of a key term presented as a hyperlink; and presenting the subset of similar passage instances associated with the selected key term in the user interface.

20. The computer system of claim 19, wherein the means for determining at least one key term further comprises:

means for performing a TF-IDF analysis of the context aggregation to determine the at least one key term.

21. The computer system of claim 19, wherein the means for determining at least one key term further comprises:

means for generating candidate n-grams based on the context aggregation; and means for performing a TF-IDF analysis of the candidate n-grams to determine the at least one key term.

22. The computer system of claim 19, further comprising: means for combining words from metadata describing individual ones of the plurality of documents containing instances of the similar passage with the context aggregation;

wherein determining at least one key term related to the similar passage is based at least in part on the metadata.

23. The computer system of claim 19, wherein first and second key terms are determined for the similar passage, further comprising:

means for determining a relationship between the first and second key terms of the similar passage.

24. The computer system of claim 23, wherein there exists a plurality of other similar passages, with each other similar passage having an associated set of key terms, and the means for determining a relationship comprises:

means for determining whether the first and second key terms are co-located in a set of key terms associated with an other similar passage;

means for declaring that the first and second key terms of the similar passage are related responsive to a positive determination that the first and second key terms are co-located in a set of key terms associated with the other similar passage.

25. The computer system of claim 19, wherein presenting a key term as a hyperlink comprises presenting text associated with the key term and presenting a number of similar passage instances in the subset of similar passage instances associated with the key term.

* * * * *